(12) United States Patent
Hiremath et al.

(10) Patent No.: US 7,942,640 B2
(45) Date of Patent: May 17, 2011

(54) METHOD AND APPARATUS FOR USE IN PROTECTING WIND TURBINE BLADES FROM LIGHTNING DAMAGE

(75) Inventors: Vijaykumar Muppayya Hiremath, Karnataka (IN); Kavala Venkateswara Rao, Andhra Pradesh (IN)

(73) Assignee: General Electric Company, Schenectady, NY (US)

(*) Notice: Subject to any disclaimer, the term of this patent is extended or adjusted under 35 U.S.C. 154(b) by 131 days.

(21) Appl. No.: 12/407,586

(22) Filed: Mar. 19, 2009

(65) Prior Publication Data
US 2010/0143134 A1    Jun. 10, 2010

(51) Int. Cl.
*F03D 11/00* (2006.01)

(52) U.S. Cl. .............. 416/231 R; 416/232; 29/889.21; 29/897.33

(58) Field of Classification Search ......... 416/146 R, 416/231 R, 232; 29/889.21, 897.33
See application file for complete search history.

(56) References Cited

U.S. PATENT DOCUMENTS

| | | | |
|---|---|---|---|
| 6,334,753 B1 * | 1/2002 | Tillman et al. | 415/1 |
| 6,457,943 B1 | 10/2002 | Olsen et al. | |
| 6,612,810 B1 | 9/2003 | Olsen et al. | |
| 7,354,247 B2 * | 4/2008 | Bonnet | 416/90 R |
| 7,364,407 B2 | 4/2008 | Grabau et al. | |
| 7,387,491 B2 * | 6/2008 | Saddoughi et al. | 416/62 |
| 7,435,057 B2 * | 10/2008 | Parera | 416/231 R |
| 2002/0102161 A1 | 8/2002 | Nordhoff | |
| 2003/0170122 A1 | 9/2003 | Wobben | |
| 2004/0028528 A1 | 2/2004 | Flemming | |
| 2004/0130842 A1 | 7/2004 | Johansen et al. | |
| 2004/0253114 A1 | 12/2004 | Gunneskov et al. | |
| 2005/0180853 A1 | 8/2005 | Grabau et al. | |
| 2006/0013695 A1 | 1/2006 | Pedersen | |
| 2006/0126252 A1 | 6/2006 | Mortensen | |
| 2006/0216153 A1 | 9/2006 | Wobben | |
| 2006/0280613 A1 | 12/2006 | Hansen | |
| 2007/0009361 A1 | 1/2007 | Moller et al. | |
| 2007/0041834 A1 | 2/2007 | Schram et al. | |
| 2007/0253827 A1 | 11/2007 | Dahl et al. | |
| 2008/0017788 A1 | 1/2008 | Kraemer | |

FOREIGN PATENT DOCUMENTS

| | | |
|---|---|---|
| EP | 1011182 B1 | 12/1998 |
| WO | 9607825 | 3/1996 |
| WO | 2005031158 A2 | 4/2005 |

* cited by examiner

*Primary Examiner* — Edward Look
*Assistant Examiner* — Jesse Prager
(74) *Attorney, Agent, or Firm* — James McGinness, Esq.; Armstrong Teasdale LLP

(57) ABSTRACT

A method and apparatus to facilitate protecting wind turbine blades from lightning damage include a turbine blade for use with a wind turbine, wherein the turbine blade includes a first sidewall and a second sidewall. The second sidewall is coupled to the first sidewall along a leading edge and along an axially-spaced trailing edge such that a cavity is defined between the first and second sidewalls. A relief system is coupled to at least one of the first and second sidewalls. The relief system is configured to discharge flow from the cavity when a pressure within the cavity exceeds a predetermined threshold. A method for assembling the same is described.

17 Claims, 3 Drawing Sheets

METHOD AND APPARATUS FOR USE IN PROTECTING WIND TURBINE BLADES FROM LIGHTNING DAMAGE

BACKGROUND OF THE INVENTION

The subject matter disclosed herein relates generally to wind turbines, and more specifically, to methods and apparatus for use in protecting wind turbine blades from lightning damage.

As is widely known, lightning may create a significant hazard to wind turbines. As such, at least some known wind turbines include protective equipment to facilitate preventing catastrophic damage to the wind turbines and/or wind turbine blades.

For example, in at least one known wind turbine, the wind turbine blades include metal wires or a metallic mesh to conduct electricity from the blades to the ground when struck by lightning. In such wind turbines, the blades are designed to provide an electrical path for the electricity to flow to ground in the event of a lightning strike, thus preventing damage to the blades and/or turbine.

Although such protective systems are frequently used, the effectiveness of such systems may be limited. For example, as electricity is routed to ground through such wind turbine, pressure within an associated turbine blade generated by the lightning strike may damage the blade if its pressure is too high. For example, when lightning strikes a turbine blade, current induced to the blade may cause an arc to form in the air inside the turbine blade. Such arcing may increase a temperature and/or pressure inside the blade. The resulting increase in temperature or pressure may cause cracks to develop in the blade, or may even explode the blade.

If a wind turbine blade is damaged due to lightning, repair of the blade may be costly and time-consuming. Moreover, damage to the blade may require a loss of electricity generation by the wind turbine (i.e. the wind turbine operation is ceased) until the blade is replaced or repaired.

BRIEF DESCRIPTION OF THE INVENTION

In one embodiment, a blade for use with a wind turbine is provided, wherein the blade includes a first sidewall and a second sidewall. The second sidewall is coupled to the first sidewall along a leading edge and along an axially-spaced trailing edge such that a cavity is defined between the first and second sidewalls. A relief system is coupled to at least one of the first or second sidewalls. The relief system is configured to discharge flow from the cavity when a pressure within the cavity exceeds a predetermined threshold.

In another embodiment, a wind turbine is provided. The wind turbine includes a tower, a nacelle coupled to the tower, and at least one blade coupled to the nacelle. The blade includes a first sidewall and a second sidewall. The second sidewall is coupled to the first sidewall along a leading edge and along an axially-spaced trailing edge such that a cavity is defined between the first and second sidewalls. A relief system is coupled to at least one of the first or second sidewalls. The relief system is configured to discharge flow from the cavity when a pressure within the cavity exceeds a predetermined threshold.

In yet another embodiment, a method for assembling a wind turbine is provided. The method of assembly includes coupling a nacelle to a tower and coupling at least one blade to the nacelle. The blade includes a first sidewall and a second sidewall that are coupled together along a leading edge and along an axially-spaced trailing edge such that a cavity is defined between the first and second sidewalls. The method further includes coupling a relief system to at least one of the first or second sidewalls and configuring the relief system to discharge flow from the cavity when a pressure within the cavity exceeds a predetermined threshold.

DETAILED DESCRIPTION OF THE INVENTION

Figure 1:
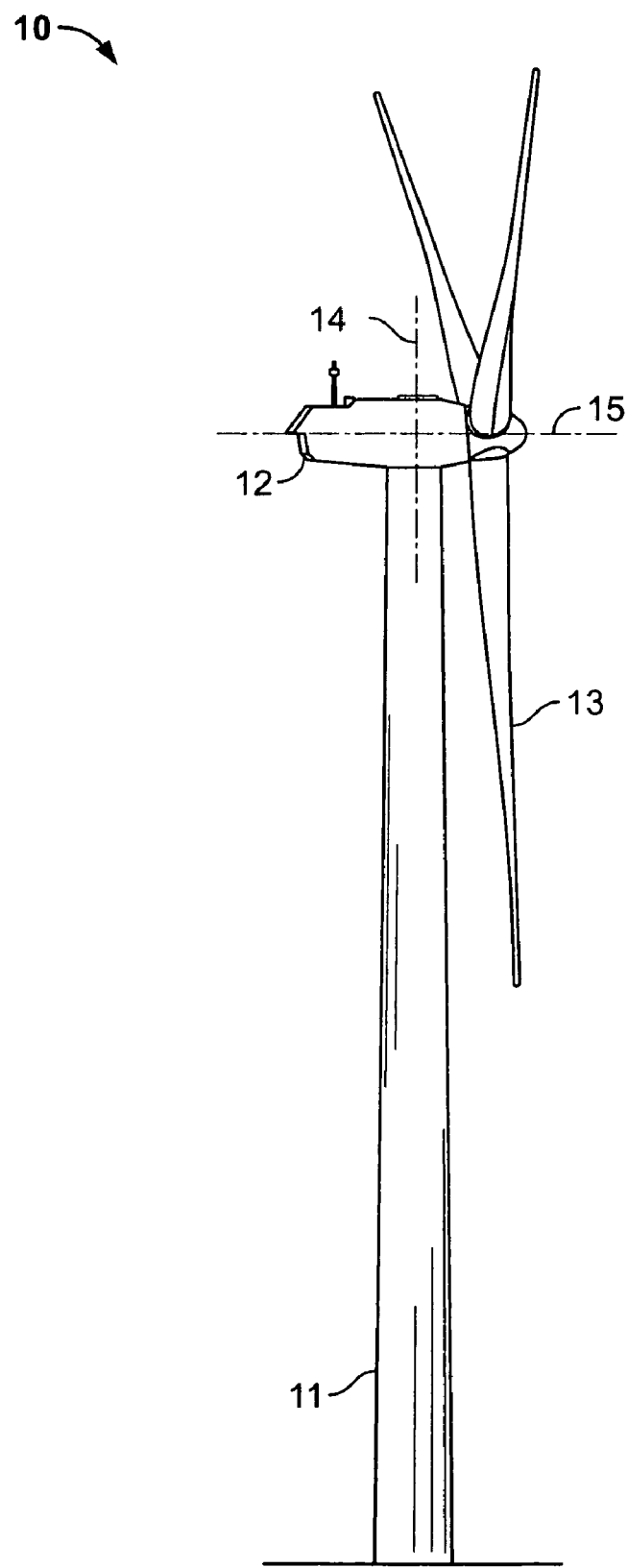
FIG. 1 is a side view of an exemplary wind turbine.
Figure 2:
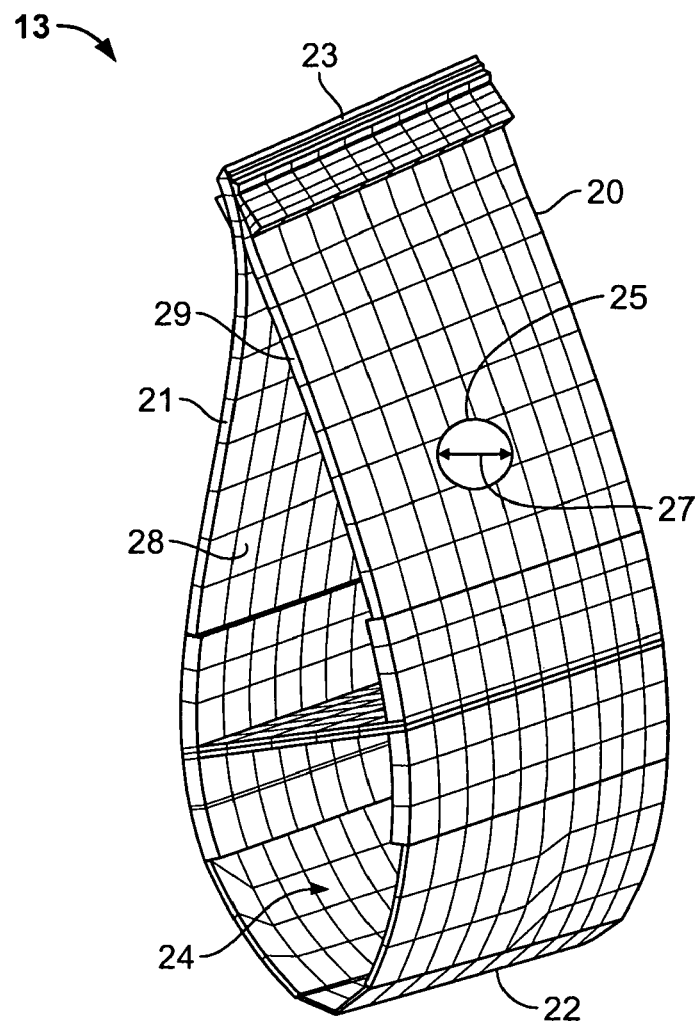
FIG. 2 is a cross-sectional view of an exemplary wind turbine blade that may be used with the wind turbine shown in FIG. 1.

FIG. 1 is a side view of an exemplary wind turbine 10. FIG. 2 illustrates a cross-sectional view of a portion of an exemplary blade 13. In the exemplary embodiment, wind turbine 10 includes a tower 11, a nacelle 12 that is coupled to tower 11, and at least one blade 13 coupled to nacelle 12. Tower 11 provides support for nacelle 12 and for blade 13. A height and construction of tower 11 are variable, as is known in the art.

Nacelle 12 is coupled to tower 11. Nacelle 12 typically houses a gearbox and other components (not shown) for transforming rotational energy of blade 13 into electricity. Wind turbine 10 comprises at least one blade 13 that is coupled to nacelle 12. In the exemplary embodiment, turbine 10 includes three blades 13.

In the exemplary embodiment, blades 13 are identical and each includes a first sidewall 20 and an opposite second sidewall 21. Second sidewall 21 is coupled to first sidewall 20 along a leading edge 22 and along an axially-spaced trailing edge 23. First sidewall 20 and second sidewall 21 are coupled together in such a way that a cavity 24 is defined between first and second sidewalls 20 and 21, respectively. Specifically, cavity 24 is bordered at least in part by inner surfaces 28 and 29 of each respective blade.

During operation, as wind strikes blade 13, blade 13 is configured to transform the kinetic energy of the wind into rotational energy. Specifically, as wind strikes blades 13, blades 13 are rotated about an axis of rotation 15. Axis of rotation 15 of blades 13 is generally parallel to a horizontal component of the wind and is generally perpendicular to a centerline axis 14 of tower 11.

Rotation of blades 13 turns a gearbox (not shown) within nacelle 12. The gearbox is coupled to a generator (not shown) within nacelle 12 that generates electricity that is transmitted via a cable (not shown) through tower 11 and to a power grid or other destination.

In the exemplary embodiment, either first sidewall 20 and/or second sidewall 21 includes one or more openings 25 defined therein. Each opening 25 extends through first sidewall 20 and/or second sidewall 21 from a respective external surface of each sidewall 20 and 21 to each inner surface 28 and 29. As such, each opening 25 is coupled in flow communication with cavity 24. In the exemplary embodiment, each opening 25 is substantially circular. Alternatively, each opening 25 may have any cross-sectional shape that enables wind turbine 10 to function as described herein. A location of each opening 25 relative to each blade 13 is variably selected to facilitate operation of wind turbine 10 as described herein. More specifically, openings 25 may be arranged within first sidewall 20 and/or second sidewall 21 in a predefined pattern that optimizes the structural integrity and/or aerodynamic performance of blade 13.

Figure 3:
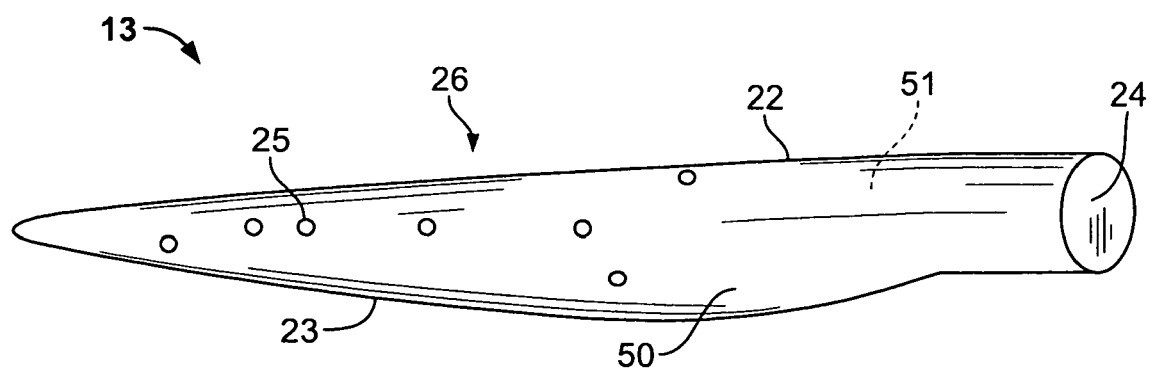
FIG. 3 is a side perspective view of an exemplary wind turbine blade including a relief system.
Figure 4:
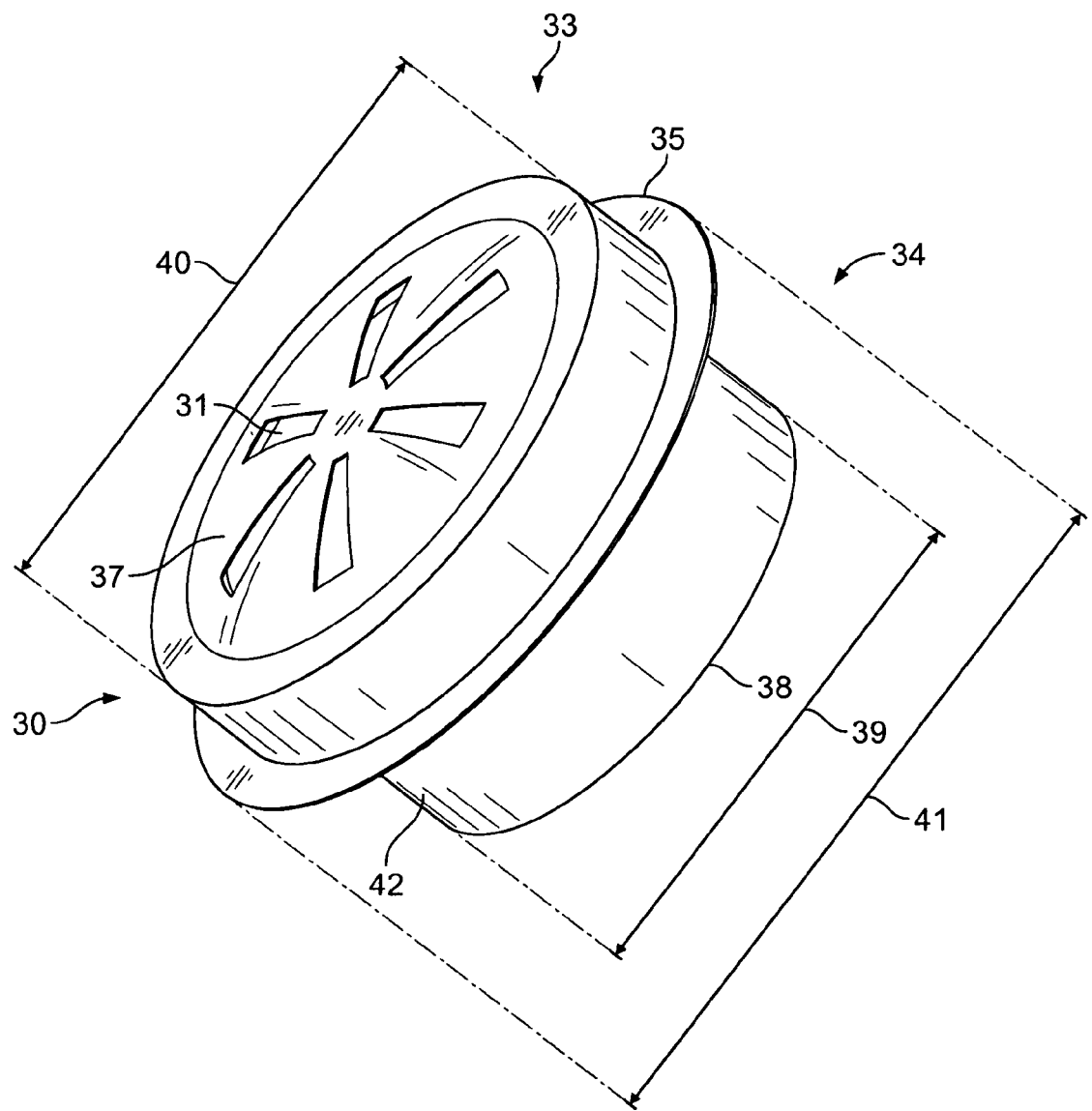
FIG. 4 is an enlarged perspective view of an exemplary plug that may be used with the relief system shown in FIG. 3.

FIG. 3 illustrates a side perspective view of an exemplary blade 13 including a relief system 26. FIG. 4 is an enlarged perspective view of an exemplary relief plug 30 used with relief system 26. In the exemplary embodiment, relief system 26 is coupled to, or is formed integrally with, either first sidewall 20 and/or second sidewall 21 (shown in FIG. 2).

In the exemplary embodiment, relief system 26 includes at least one relief plug 30 that is inserted into an opening 25 (shown in FIG. 2) defined in either first sidewall 20 or second sidewall 21. Relief system 26 cooperates with openings 25 and each relief plug 30 is inserted into a respective opening 25, as described herein. In one embodiment, each relief plug 30 is sized and shaped such that when plug 30 is inserted into an opening 25, an outer surface 37 of each plug 30 is substantially flush with an outer surface 50 or 51 of each respective first sidewall 20 or second sidewall 21. As such, in such an embodiment, relief plug 30 does not adversely impact an aerodynamic profile of, or the aerodynamic performance of, blade 13. Furthermore, in such embodiment, when relief plug 30 is fully inserted into opening 25, plug 30 substantially seals each opening 25.

In the exemplary embodiment, relief plug 30 is formed with an insertion portion 34 and a head portion 33. Insertion portion 34 is hollow and is formed integrally with, and extends from, head portion 33. Moreover, in the exemplary embodiment, insertion portion 34 is substantially cylindrical and has an outer diameter 39, defined by an outer surface 42 of insertion portion 34 that is smaller than a diameter 27 (shown in FIG. 2) of each opening 25. More specifically, insertion portion 34 extends from a radially inner end 38 of relief plug 30 to a flange 35 that circumscribes plug 30 and extends radially outward from plug 30. In an alternative embodiment, insertion portion 34 is not substantially cylindrical, and at least a portion of relief plug 30 and/or flange 35 is sized and shaped to substantially mate with opening 25 such that opening 25 is substantially sealed when plug 30 is fully inserted therein.

Head portion 33 extends from flange 35 to plug outer surface 37. In the exemplary embodiment, head portion 33 has a substantially circular cross-sectional profile and is formed with an outer diameter 40 that is smaller than an outer diameter 41 of flange 35. Flange diameter 41 is larger than opening diameter 27. As such, in the exemplary embodiment, when relief plug 30 is inserted within opening 25, flange 35 limits an insertion depth of plug 30 within each opening 25. More specifically, flange 35 is sized to prevent head portion 33 from entering opening 25 and is sized such that opening 25 is substantially sealed after relief plug 30 is fully inserted within opening 25. Moreover, in the exemplary embodiment, head portion 33 is formed with a diaphragm 31 therein. Diaphragm 31, as described in more detail below, is fabricated to rupture when exposed to a predetermined pressure.

In another embodiment, opening 25 includes a counterbore portion (not shown). In such embodiment, when relief plug 30 is inserted within opening 25, flange 35 is seated within counterbore portion, such that opening 25 is substantially sealed. Head portion 33 extends radially outward from counterbore portion to sidewall outer surface 50 or 51.

During operation, when pressure within blade cavity 24 exceeds a predetermined threshold, as may occur when blade 13 is subjected to a lightning strike, relief plug 30 is ejected from first sidewall 20 or second sidewall 21 and/or diaphragm 31 is ruptured as a pressure wave propagates through blade cavity 24. Alternatively, relief plug 30 may be constructed such that only a portion of plug 30 is ejected and/or ruptured when pressure within blade cavity 24 exceeds a predetermined threshold. In one alternative embodiment, diaphragm 31 ruptures before relief plug 30 is ejected when pressure within blade cavity 24 exceeds a predetermined threshold. In another embodiment, relief plug 30 is ejected before diaphragm 31 ruptures when pressure within blade cavity 24 exceeds a predetermined threshold. In yet another embodiment, diaphragm 31 ruptures and relief plug 30 is ejected at substantially the same time when pressure within blade cavity 24 exceeds a predetermined threshold. Ejection and/or rupture of relief plug 30 does not damage blade 13, but rather, once plug 30 is ejected and/or ruptured, high pressure fluid is discharged from blade cavity 24, thus reducing an overall pressure within cavity 24. Additional relief plugs 30 may also be ejected and/or ruptured, depending on the pressure within cavity 24. As a result of the discharge and/or rupture of relief plugs 30, pressure within blade cavity 24 is facilitated to be decreased while reducing potential damage to blade 13. Because of the relatively small size of relief plugs 30 as compared to blade 13, blade 13 may continue to operate with only minor aerodynamic performance losses.

In another embodiment, relief system 26 does not include relief plugs 30, but rather system 26 includes at least one diaphragm, a rupture disk, and/or any other component coupled to blade 13 and configured to discharge pressurized flow from cavity 24 to reduce an operating pressure within cavity 24 as described herein. In another embodiment, relief plug 30 includes an outer perimeter (not shown) which has a shape that mates substantially flush against a perimeter of opening 25 when plug 30 is inserted fully within opening 25. In such an embodiment, plug perimeter facilitates increasing a rigidity of blade 13 in areas adjacent to openings 25. Moreover, in such an embodiment, plug 30 may also facilitate decreasing the effects or impact of stresses induced within blade 13.

Existing wind turbines and wind turbine blades may be retrofitted to use relief system 26 described herein. One or more openings, such as openings 25, may be formed in existing wind turbine blades to accommodate the insertion of one or more relief plugs 30, or other embodiments of relief system 26 described above. Existing blades may be retrofitted without removing the blades from the wind turbine or otherwise disassembling the wind turbine.

A method for assembling a wind turbine 10 is also described. In the exemplary embodiment, nacelle 12 is coupled to tower 11, and at least one blade 13 is coupled to nacelle 12. Second sidewall 21 is coupled to first sidewall 20 along blade leading edge 22 and along axially-spaced trailing edge 23 such that cavity 24 is defined between first sidewall 20 and second sidewall 21. A relief system 26 is then coupled to either first sidewall 20 and/or to second sidewall 21. Relief system 26, as described herein, enables flow to be discharged from cavity 24 when an operating pressure within cavity 24 exceeds a predetermined threshold.

The above-described methods and apparatus facilitate protecting wind turbines and wind turbine blades from damage caused by lightning strikes. By providing one or more plugs that may be ejected and/or ruptured when pressure rises above a predetermined threshold, one or more pressure discharge flow paths are created that enable high pressure fluids contained within a blade to be discharged. The plugs may be replaced without replacing the blades. Moreover, the insertion of plugs in a blade may facilitate increasing the structural strength of the blade. The above-described methods and apparatus facilitate improving protection of wind turbines and wind turbine blades from lightning strike pressure and/or temperature damage.

Exemplary embodiments of methods and apparatus for protecting wind turbine blades from lightning damage are described above in detail. The methods and apparatus are not limited to the specific embodiments described herein, but rather, components of the methods and apparatus may be used independently and separately from other components described herein. For example, such relief plugs may also be used in combination with other lightning protection systems and methods, and are not limited to practice with only a wind turbine as described herein. Rather, the present invention can be implemented and utilized in connection with many other applications using airfoils.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blade for use with a wind turbine, said blade comprising:
   a first sidewall;
   a second sidewall coupled to said first sidewall along a leading edge and along an axially-spaced trailing edge such that a cavity is defined between said first and second sidewalls, wherein an opening is defined in at least one of said first and second sidewalls; and
   a relief system coupled to at least one of said first and second sidewalls, said relief system configured to discharge flow from said cavity when a pressure within said cavity exceeds a predetermined threshold, wherein said relief system comprises at least one plug comprising a flange and a head portion extending from said flange such that said flange prevents said head portion from entering the opening when said at least one plug is inserted into the opening.

2. A blade in accordance with claim 1 wherein at least a portion of said at least one plug is at least one of ejected and ruptured from said blade when a pressure within said cavity exceeds a predetermined threshold.

3. A blade in accordance with claim 1 wherein said plug comprises an outer perimeter that facilitates increasing a rigidity of said blade.

4. A blade in accordance with claim 1 wherein said plug comprises a membrane configured to rupture to discharge flow from said cavity when a pressure within said cavity exceeds a predetermined threshold.

5. A blade in accordance with claim 1 wherein at least one of said plugs is coupled to said first sidewall and at least one of said plugs is coupled to said second sidewall.

6. A wind turbine comprising:
   a tower;
   a nacelle coupled to said tower;
   at least one blade coupled to said nacelle and comprising:
      a first sidewall;
      a second sidewall coupled to said first sidewall along a leading edge and along an axially-spaced trailing edge such that a cavity is defined between said first and second sidewalls, wherein an opening is defined in at least one of said first and second sidewalls; and
      a relief system coupled to at least one of said first and second sidewalls, said relief system configured to discharge flow from said cavity when a pressure within said cavity exceeds a predetermined threshold, wherein said relief system comprises at least one plug comprising a flange and a head portion extending from said flange such that said flange prevents said head portion from entering the opening when said at least one plug is inserted into the opening.

7. A wind turbine in accordance with claim 6 wherein at least a portion of said at least one plug is at least one of ejected and ruptured from said blade when a pressure within said cavity exceeds a predetermined threshold.

8. A wind turbine in accordance with claim 6 wherein said plug comprises an outer perimeter that facilitates increasing a rigidity of said blade.

9. A wind turbine in accordance with claim 6 wherein said plug comprises a membrane configured to rupture to discharge flow from said cavity when a pressure within said cavity exceeds a predetermined threshold.

10. A wind turbine in accordance with claim 6 wherein at least one of said plugs is coupled to said first sidewall and at least one of said plugs is coupled to said second sidewall.

11. A wind turbine in accordance with claim 6 wherein each of said plugs is replaceable without removing said blade from said wind turbine.

12. A method for assembling a wind turbine, said method comprising:
   coupling a nacelle to a tower;
   coupling at least one blade to the nacelle, wherein the blade includes a first sidewall, and a second sidewall that are coupled together along a leading edge and along an axially-spaced trailing edge such that a cavity is defined between the first and second sidewalls, wherein an opening is defined within at least one of the first and second sidewalls; and
   coupling a relief system to at least one of the first and second sidewalls, wherein the relief system is configured to discharge flow from the cavity when an operating pressure within the cavity exceeds a predetermined threshold, wherein said coupling a relief system to at least one of the first and second sidewalls comprises inserting at least one plug into the opening, the at least one plug including a flange and a head portion extending from the flange such that the flange prevents the head portion from entering the opening when the at least one plug is inserted into the opening.

13. A method for assembling a wind turbine in accordance with claim 12 wherein coupling a relief system to at least one of the first and second sidewalls further comprises configuring at least a portion of the at least one plug to be at least one of ejected and ruptured from the blade when a pressure within the cavity exceeds a predetermined threshold.

14. A method for assembling a wind turbine in accordance with claim 12 wherein coupling a relief system to at least one of the first and second sidewalls further comprises coupling an outer perimeter of the plug to the blade to facilitate increasing a rigidity of the blade.

15. A method for assembling a wind turbine in accordance with claim 12 wherein coupling a relief system to at least one of the first and second sidewalls further comprises coupling a membrane to the plug that is configured to rupture to enable flow to be discharged from the cavity when an operating pressure within the cavity exceeds a predetermined threshold.

16. A method for assembling a wind turbine in accordance with claim 12 wherein coupling a relief system to at least one of the first and second sidewalls further comprises coupling a plug to the first sidewall and coupling a plug to the second sidewall.

17. A method for assembling a wind turbine in accordance with claim 12 wherein coupling a relief system to at least one of the first and second sidewalls further comprises configuring a relief system such that the relief system is able to be replaced without removing the blade from the wind turbine.

* * * * *